United States Patent [19]
Nanbu

[11] Patent Number: 5,996,918
[45] Date of Patent: Dec. 7, 1999

[54] FISHING REEL BRAKING DEVICE

[75] Inventor: Kazuya Nanbu, Saitama, Japan

[73] Assignee: Daiwa Seiko, Inc., Tokyo, Japan

[21] Appl. No.: 08/861,068

[22] Filed: May 21, 1997

[30] Foreign Application Priority Data

May 21, 1996 [JP] Japan .................................. 8-125880
Jun. 26, 1996 [JP] Japan .................................. 8-165835

[51] Int. Cl.⁶ .............................................. A01K 89/02
[52] U.S. Cl. ......................... 242/267; 242/268; 242/319
[58] Field of Search ................................ 242/267, 268, 242/319

[56] References Cited

U.S. PATENT DOCUMENTS

| | | |
|---|---|---|
| 2,646,937 | 7/1953 | Johnson, et al. . |
| 2,646,939 | 7/1953 | Hirsch ..................................... 242/268 |
| 2,760,357 | 8/1956 | Burns ..................................... 242/268 |
| 4,911,378 | 3/1990 | Hitomi .................................... 242/319 |
| 5,064,138 | 11/1991 | Sato ....................................... 242/368 |
| 5,328,127 | 7/1994 | Yoshikawa .............................. 242/319 |

FOREIGN PATENT DOCUMENTS

| | | |
|---|---|---|
| 63-107175 | 7/1988 | Japan . |
| 63-167730 | 7/1988 | Japan . |
| 6-38047 | 10/1994 | Japan . |

*Primary Examiner*—Donald P. Walsh
*Attorney, Agent, or Firm*—Liniak, Berenato, Longacre & White

[57] ABSTRACT

A fishing reel braking device adapted to apply a braking force to the drive gear, the base end portion of an accommodating cylinder adapted to accommodate the braking member is secured to the base end portion of the drive gear in a non-rotating posture. Hence, the braking device, when compared with the conventional ones is reduced in the number of component, and simplified in structures Furthermore, the braking device of the invention is prevented from being bulky in the direction of axis of the handle shaft, and is improved in fishing operability. Further, seal members of elastic material are provided about the braking member to sealingly accommodate the braking member in an accommodating section.

33 Claims, 8 Drawing Sheets

FISHING REEL BRAKING DEVICE

BACKGROUND OF THE INVENTION a) Field of the Invention

This invention relates to fishing reels, and more particularly to a braking device which applies a braking force to a drive gear mounted on a handle shaft.

b) Description of the Prior Art

In general, a fishing reel is equipped with a braking device to apply an adjustable braking force to a drive gear mounted on its drive shaft. That is, in a double-bearing type fishing reel, a drive gear is mounted on a handle shaft which is driven with a handle, and a braking member is provided for the drive gear thus mounted in such a manner that the former is frictionally engageable with the latter. The pressure of the braking member which is applied to the drive gear is adjusted to control the braking force between the handle shaft and the drive gear.

The aforementioned drive gear is engaged with the spool pinion to wind the fishing line under a heavy load. Hence, the teeth of the drive gear are made of a material high in mechanical strength. Accordingly, a cylinder which is integral with the drive gear and is adapted to accommodate the braking member is also made of the same material. Hence, the material cost is high, and the manufacturing cost is also high. Thus, the resultant fishing reel is high in manufacturing cost, and heavy in weight.

In order to overcome this difficulty, U.S. Pat. No. 2,646,939 has disclosed a technique that the teeth of the drive gear, and the cylinder adapted to accommodate the braking member are provided as separate components so that they can be formed with different materials, and those components are locked to each other in a non-rotating posture with pins inserted axially.

However, because the cylinder is locked to the surface of the drive gear with the locking members in a non-rotating posture, the axial length of the handle side is increased as much; that is, the fishing reel is increased in size. Accordingly, the center of the weight thereof is shifted towards the handle, which adversely affects the fishing-line winding operation. Furthermore, as was described above, the cylinder and the drive gear are provided as separate components, and they are combined together with the pins inserted axially. Hence, the resultant fishing reel is large in the number of components, and it is rather difficult to assemble the fishing reel.

The braking device of this type should be a water-proof, otherwise water entering it sticks on the braking member, so that the frictional resistance is changed, and accordingly the braking force is lowered, or the braking action becomes irregular. Since no water-proof structure is provided between the drive gear and the shaft, the fishing reel is not sufficiently waterproofed when it is used in an environment where water or sea water is liable to enter the braking mechanism In order to overcome this difficulty, Japanese Utility Patent Application (OPI) No. 107175/1988 (the term "OPI" as used herein means an "unexamined published application"), Japanese Patent Application (OPI) No. 167730/1988, and Japanese Utility Patent Application Publication No. 38047/1994 have disclosed techniques that a braking device for applying a braking force to a drive gear mounted on a handle shaft is waterproofed.

The above-described braking devices are each designed as follows. Its drive gear has a cylindrical portion. A braking board and a frictional board, which form a braking member, are arranged in the cylindrical portion of the drive gears and the cylindrical portion is covered with a cover member. In the technique disclosed by Japanese Utility Patent Application (OPI) No. 107175/1988, a seal member made of an elastic material is arranged between the cover member and the shaft. In the technique disclosed by Japanese Patent Application (OPI) No. 167730/1988, a seal member is provided between the cylindrical portion of the drive gear and the cover member. In the technique disclosed by Japanese Utility Patent Application Publication no. 38047/1994, a drag shaft cylinder is engaged with the handle shaft in a non-rotating posture, and a frictional board and a braking board are arranged on the drag shaft cylinder, and seal members are arranged between the drag shaft cylinder and the drive gear, between the drag shaft cylinder and the cover member, and between the drive gear's cylindrical portion and the cover member, respectively.

In the techniques disclosed by the Japanese Utility Patent Application (OPI) No. 107175/1988 and Japanese Patent Application (OPI) No. 167730/1988, no water-proof structure is provided between the drive gear and the shafts Hence, in a fishing operation which is carried out in a circumference where water or sea water is liable to enter the braking device, those techniques are not satisfactory in water-proof function.

In the technique disclosed by the Japanese Utility Patent Application No. 38047/1994, the drag shaft cylinder is fitted on the handle shaft, and the drive gear, the frictional board, etc. are provided on the drag shaft cylinder. Accordingly, the drive gear is necessarily large in diameter. As a result, the gear box; that is, the reel side boards are bulky. In addition, the reel is intricate in structure, and accordingly it is large in weight; more specifically, the reel is poor in weight balance; that is, the reel is low in fishing operability. Furthermore, since, as was described above, the drag shaft cylinder is engaged with the handle shaft in a non-rotating posture, it is difficult to maintain the engagement of the drive gear with the pinion high in accuracy

SUMMARY OF THE INVENTION

Accordingly, an object of the invention is to provide a fishing reel braking device adapted to apply a braking force to the drive gear, in which the number of components is reduced with the axial length maintained unchanged Another object of the invention is to provide a fishing reel braking device which is excellent in water-proof characteristic.

According to this invention, the base end portion of an accommodating cylinder adapted to accommodate the braking member is secured to the base end portion of the drive gear in a non-rotating posture. Hence, the braking device, when compared with the conventional one, is reduced in the number of component, and simplified in structure. Furthermore, the braking device of the invention is prevented from being bulky in the direction of axis of the handle shaft, and is improved in fishing operability.

Further, seal members are mounted about the braking mechanism. This feature makes it possible to reduce the diameter of the drive gear and accordingly to miniaturize the gear box. The braking member applying a frictional force to the drive gear is sealingly accommodated, with the aid of the above-described seal member, in the accommodating section which is defined by the drive gear, the handle shaft, and the pressing member, which prevents water or sea water from flowing to the braking member.

BRIEF DESCRIPTION OF THE DRAWINGS

A fishing reel braking device according to the invention will be described with reference to the accompanying drawings.

DETAILED DESCRIPTION OF THE PREFERRED EMBODIMENTS

Figure 1:
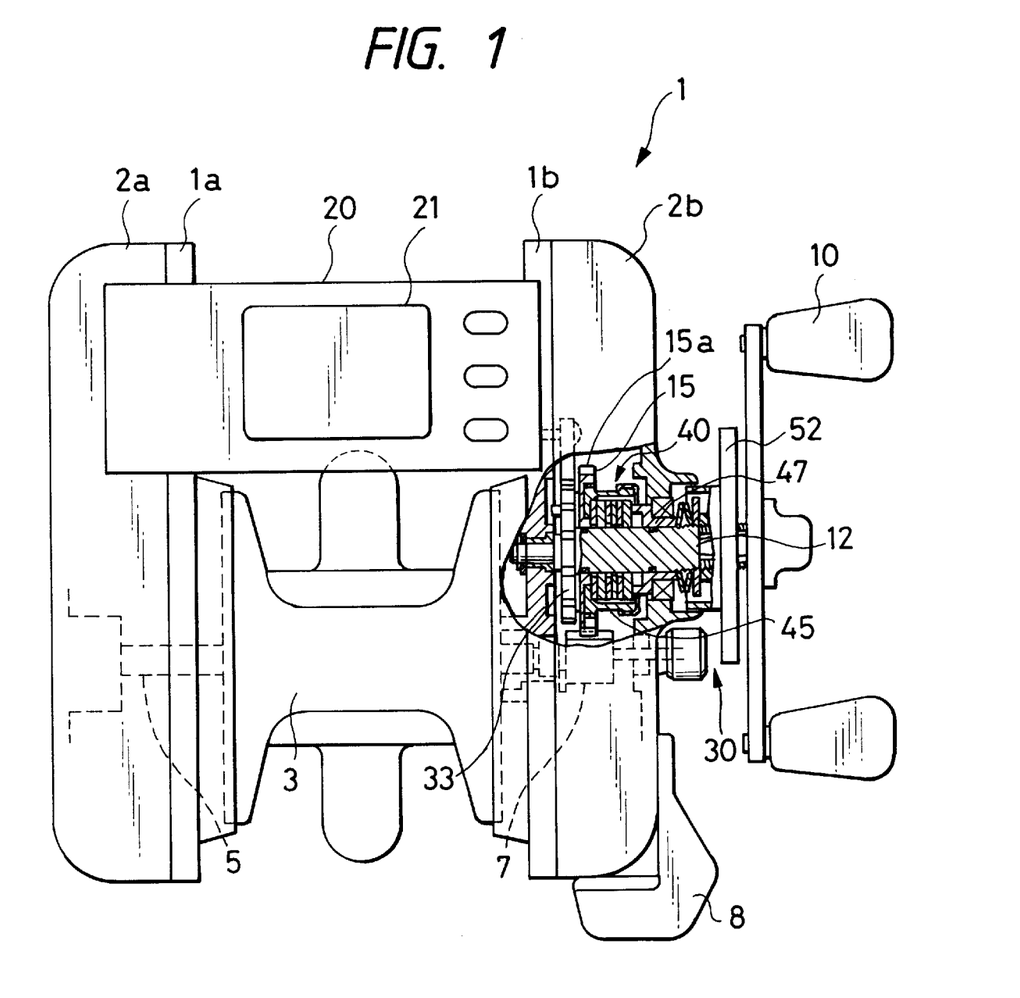
FIG. 1 is a plan view showing an example of a double-bearing type fishing reel, with parts of a braking device cut away, which constitutes a first embodiment of the invention.
Figure 2:
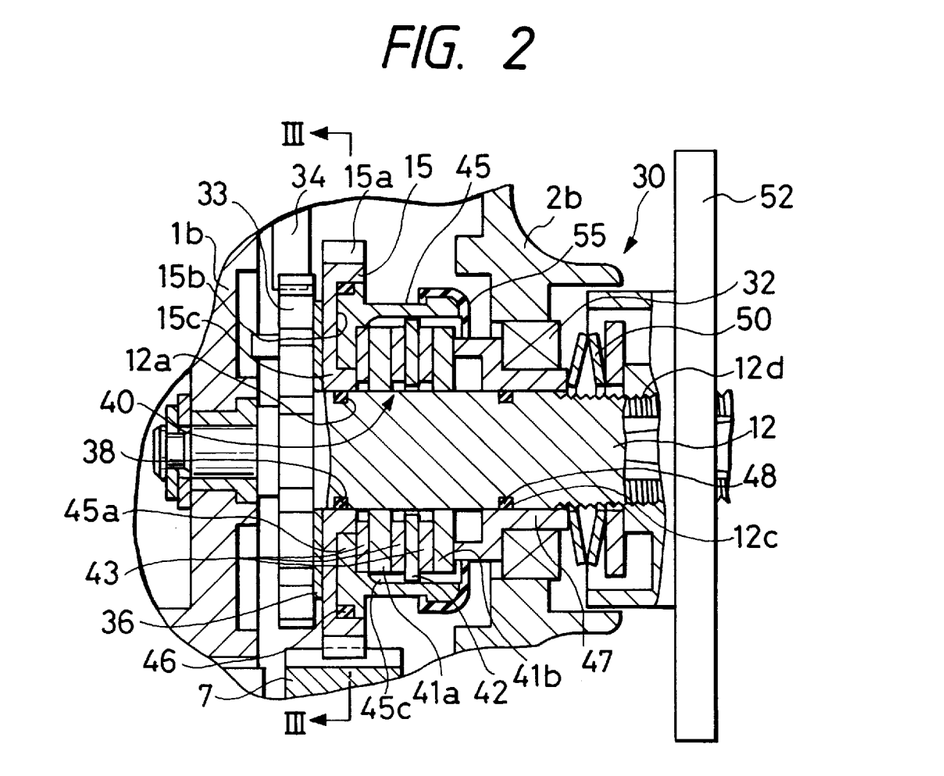
FIG. 2 is an enlarged diagram showing parts of the braking device.
Figure 3:
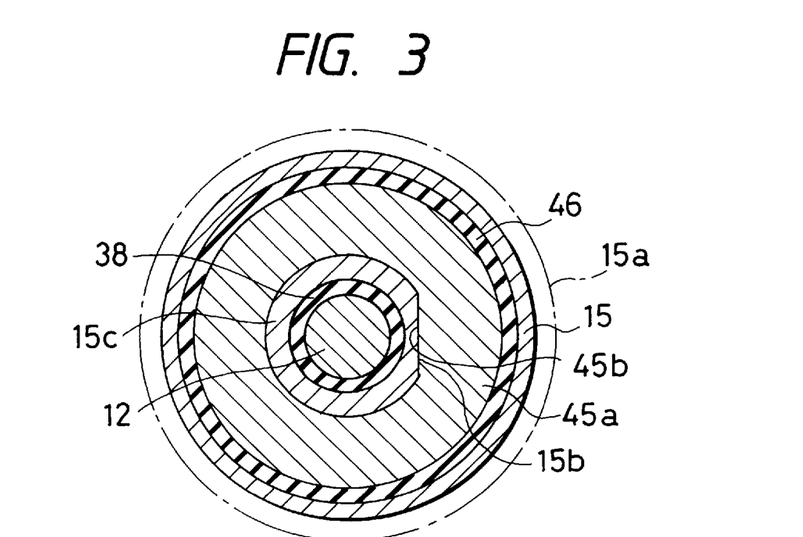
FIG. 3 is a sectional view taken along line III—III in FIG. 2

With reference to FIGS. 1–3, the structure of the double-bearing type fishing reel will be outlined.

The right and left frames 1b and 1a of a reel body 1 are covered with outside boards 2b and 2a, respectively. A spool shaft 5, on which a spool 3 is mounted, is rotatably mounted between the right and left frames 1b and 1a. On one end portion of the spool shaft 5, a pinion 7 is provided in such a manner that it is axially movable and is brought into and out of engagement with the spool shaft 5. The pinion 7 is slid by operating a conventional clutch change-over lever 8 which is protruded from the right side board 2b, so that a drive force provided by a handle shaft (described later) is applied to the spool shaft 5.

The pinion 7 is engaged with a drive gear 15 which is rotatably supported on a handle shaft. As shown in FIG. 2, a braking device 30 is provided between the handle shaft 12 and the drive gear 15. The braking force of the braking device 30 can be smoothly adjusted in a range from a fully engaged condition where the handle shaft 12 and the drive shaft are rotated as one unit to a disengaged condition where the drive gear 15 is freely turned.

In the embodiment shown in FIG. 1, an electronic control mechanism 20 is provided between the right and left side boards 2b and 2a in front of the spool 3 to indicate a variety of data. Those data are digitally displayed on a display screen 21 in the surface of the electronic control mechanism 20. For instances the length of a fishing line let out of the spool, and the present time are digitally displayed on a display screen 21.

Now, the structure of the braking device 30 will be described.

The base end portion of the above-described handle shaft 12 is supported by the right side frame 1b in such a manner that it is rotatable and is prevented from coming off the right side frame 1b. The other end portion, or the front end portions of the handle shaft 12 is rotatably supported on the right side board 2b through a pressing member (described later) with the aid of a bearing 32. A reverse-rotation preventing gear 33 is fixedly mounted on the base end portion of the handle shaft 12. A reverse-rotation preventing pawl 34 is engaged with the reverse-rotation preventing gear 33 to prevent the reverse rotation of the handle shaft 12. The aforementioned drive gear 15 is rotatably mounted on the handle shaft 12 with a washer 36 on the reverse-rotation preventing gear 33. An annular groove 12a is formed in the cylindrical surface of the part of the handle shaft 12 on which the drive gear 15 is mounted. An elastic seal member 38 is fitted in the annular groove 12a to seal the gap between the drive gear 15 and the handle shaft 12.

The outer cylindrical portion of the drive gear 15 is formed into external teeth 15a which are engaged with the pinion 7. An annular recess 15b is formed in the side surface of the drive gear 15; that is, it is defined by a central boss 15c which includes a non-circular portion 15d (FIG. 3). The base end portion 45a of an accommodating cylinder 45 is fitted in the annular recess 15b. The accommodating cylinder 45 is adapted to accommodate a braking member 40 which frictionally engages the drive gear 15 with the handle shaft 12. The inner peripheral portion of the base end portion 45a includes a non-circular portion 45b corresponding to the aforementioned non-circular portion 15d of the drive gear 15 (see FIG. 3). Thus, the accommodating cylinder 45 is fitted in the drive gear 15 in a non-rotating posture. As shown in FIG. 2, in order that the cylinder 45 is not so long in the direction of axis, the depth of the annular recess 15b is set to the extent that the base end portion 45a is completely buried in the annular recess 15b; that is, the surface of the base end portion 45a is substantially flush with the side surface of the drive gear 15. An elastic member 46 is interposed between the outer cylindrical surface of the base end portion 45a and the annular recess 15b; that is, the accommodating cylinder 45 is elastically engaged with the drive gear 15 so that they are not played with respect to each other.

The braking member 40 arranged in the aforementioned accommodating cylinder 40 comprises: two braking boards 41a and 41b which are mounted on the handle shaft 12 in a non-rotating posture; a braking board 42 which is arranged between those braking boards 41a and 41b, and which engages with a pair of grooves 45c, which are formed at angular intervals of 180° in the accommodating cylinder 45, to turn together with the drive gear 15; and lining members 43 rotatably interposed between the braking boards 41a, 42 and 41b and between the braking board 41a and the drive gear 15. The structure of the braking member 40 is not always limited that which has been described above: that is, it may be changed or modified without departing from the invention.

A pressing member 47, which is movable axially on the handle shaft 12 is abutted against the surface (on the handle side) of the braking board 41b. An annular groove 12c is formed in the outer cylindrical surface of the part of the handle shaft 12 on which is the pressing member 47 is positioned. A seal member 48 of elastic material is fitted in the annular groove 12c to sealingly close the gap between the pressing member and the handle shaft. As will be discussed in more detail below, a cap-shaped elastic seal member 55 is fitted on the end portion of the accommodating cylinder 45 in such a manner that it is rotatable with respect to the pressing member 47 and sealingly closes the gap between the accommodating cylinder 45 and the pressing member 47.

The end portion of the handle shaft 12 is formed into a threaded portion 12d. Drag washers 50 abutting against the pressing member 47, and a drag adjusting member 52 pressing the drag washers are threadably mounted on the threaded portion 12d. Hence, by turning the drag adjusting member 52, the pressing member 47 is axially moved back and forth, so that a desired braking force (or frictional engaging force) is applied to the drive gear 15 through the braking member 40 pressed by the pressing member 47.

As was described above, the base end portion 45a of the accommodating cylinder 45, in which the braking member 40 is accommodated, is fixed to the side portion of the drive gear 15 in a non-rotating posture. Hence, the teeth 15a and the accommodating cylinder 45 may be formed of different materials, and are simple in structure, which prevents the reel from being increased in length in the direction of axis of the handle shaft. In addition, the base end portion 45a of the accommodating cylinder 45 is buried in the drive gear in such a manner that it is substantially flush with the side surface of the drive gear 15 and is integral with the latter 15. This minimizes the amount of axial protrusion of the accommodating cylinder 45. In additions the elastic member 46 is interposed between the drive gear and the accommodating cylinder 45, so that the drive gear and the cylinder will not rotate with respect to each other; that is, they are positively engaged with each other. With the above-described structure, the accommodating cylinder 45 can be engaged with or disengaged from the drive gear 15 with ease. Hence, the replacement of the braking member (maintenance of the braking member when worn out, or replacement of the braking member with another one which is suitable for a using condition) without removal of the drive gear 15 can be achieved with ease, and in addition the teeth 15a can be prevented from damage.

One modification and second through fourth embodiments of the invention will be described with reference to FIGS. 4 through 8. In the alternate embodiments, only parts which are different from those of the above-described first embodiment will be described.

Figure 4:
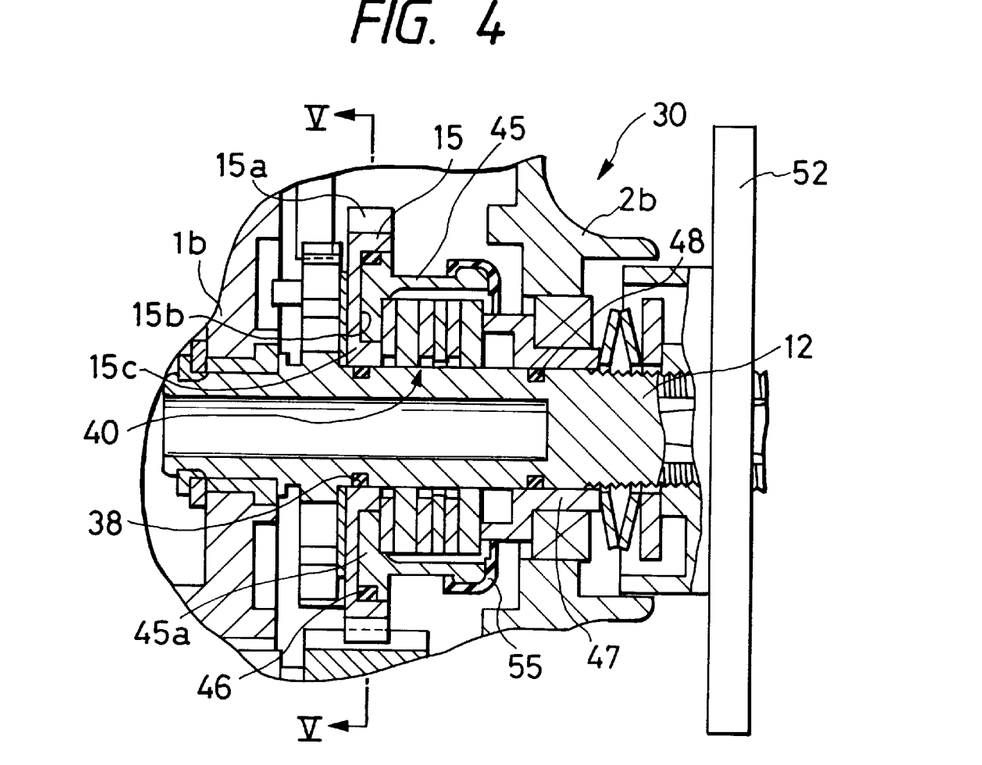
FIG. 4 is a diagram showing one modification of the fishing reel braking device according to the invention.
Figure 5:
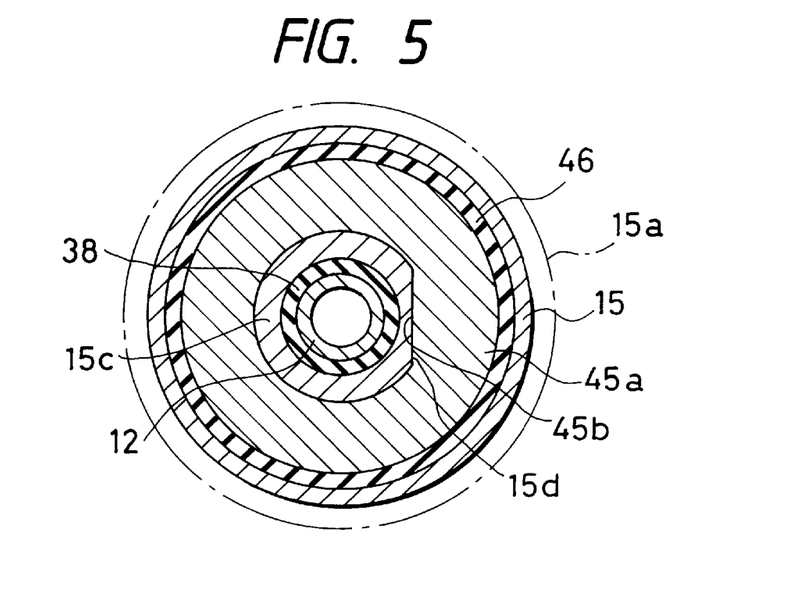
FIG. 5 is a sectional view taken along line V—V in FIG. 4.

One modification of the invention is as shown in FIGS. 4 and 5. In the modification, the handle shaft 12 is hollow from end to end, whereby, in the part of the fishing reel where the braking device 40 is arranged, the handle shaft is reduced in weight.

Figure 6:
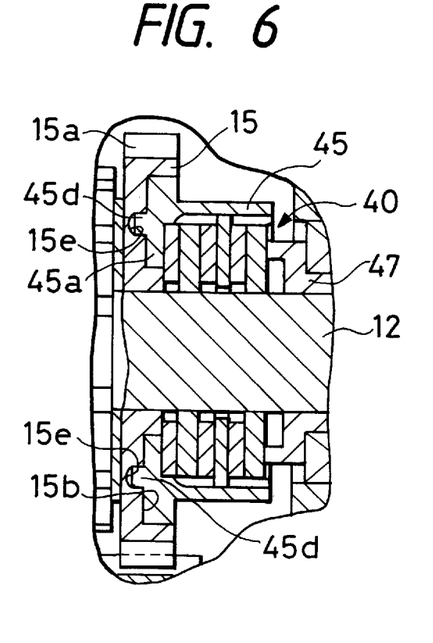
FIG. 6 is a diagram showing a second embodiment of the invention.

FIG. 6 shows a third embodiment of the invention. In the third embodiment, locking protrusions 45d are formed on the rear surface of the base end portion 45a of the accommodating cylinder 45 at predetermined angular intervals (along a circumference), while locking holes 15e are formed in the bottom of the annular recess 15b of the drive gear 15 in correspondence to the locking protrusions 45d, so that the accommodating cylinder 45 is locked to the drive gear 15 in a non-rotating posture. In the embodiment, too, the base end portion 45a of the accommodating cylinder 45 is buried in the drive gear 15 in such a manner that the surface of the base end portion 45a of the accommodating cylinder 45 is substantially flush with the side surface of the drive gear 15.

Figure 7:
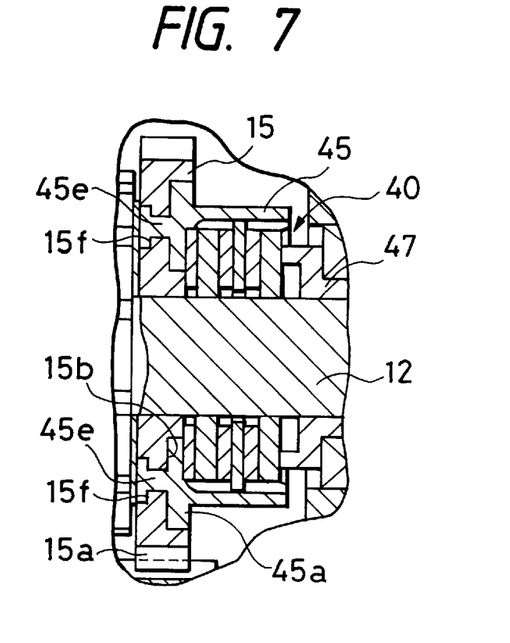
FIG. 7 is a diagram showing a third embodiment of the invention.

FIG. 7 shows a fourth embodiment of the invention. In the third embodiment, locking protrusions 45d are formed on the rear surface of the base end portion 45a of the accommodating cylinder 45 at predetermined angular intervals (along a circumference), while locking holes 15f are formed in the bottom of the annular recess 15b of the drive gear 15 in correspondence to the locking protrusions 45d, and the locking protrusions are caulked in the rear surface so that the accommodating cylinder 45 is fixedly locked to the drive gear 15. In the third embodiment, the accommodating cylinder 45 is positively coupled to the drive gear 15.

Figure 8:
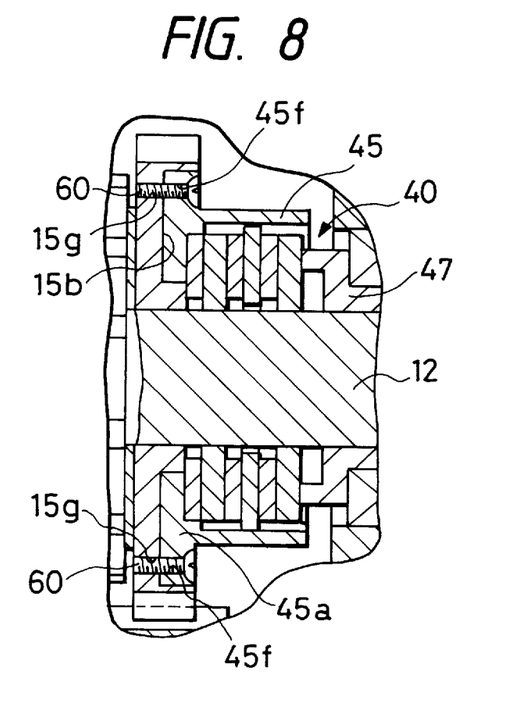
FIG. 8 is a diagram showing a fourth embodiment of the invention.

FIG. 8 shows a fifth embodiment of the invention. In the fourth embodiment, threaded holes 45f are formed in the flange of the base end portion 45a of the accommodating cylinder 45 at predetermined angular intervals (along a circumference), while threaded holes 15g are formed in the bottom of the annular recess 15b of the drive gear 15 in correspondence to the aforementioned threaded holes 45f. Under this condition, screws 60 are screwed in those threaded holes so that the accommodating cylinder 45 is fixedly secured to the drive gear 15. Similarly as in the case of FIG. 7, the accommodating cylinder 45 is positively coupled to the drive gear 15.

In the above-described third through fifth embodiments, the handle shaft may be a hollow one, and as shown in FIG. 2, an elastic member 46 may be interposed between the outer cylindrical surface of the base end portion 45a and the annular recess 15b.

In the fishing reel braking device of the invention, the base end portion of the accommodating cylinder adapted to accommodate the braking member is secured to the base end portion of the drive gear in a non-rotating posture. Hence, the braking device, when compared with the conventional one, is reduced in the number of component, and simplified in structure. Furthermore, the braking device of the invention is prevented from being bulky in the direction of axis of the handle shaft, and is improved in fishing operability.

As was described before and illustrated in FIGS. 9 and 10, the seal members 38 and 48 are sealingly mounted on the handle shaft 12 between the drive gear 15 and the handle shaft 12 and between the pressing member 47 and the handle shaft 12, thus preventing the entrance of water or sea water into the brake member, or water or sea water from flowing along the handle shaft to the braking member. In addition, a cap-shaped elastic seal member 55 is put on the leading edge of the open end of the accommodating cylinder 45 of the drive gear 15 in such a manner that it is rotatable relative to the depressing member 47 and seals the gap between the accommodating cylinder 45 and the pressing member 47, thus preventing the entrance of water or sea water along the surface of the depressing member 47. That is, with the aid of the above-described seal members 38, 48 and 55, the braking member 40 arranged in the cylindrical portion of the drive gear 15 is completely closed.

Figure 9:
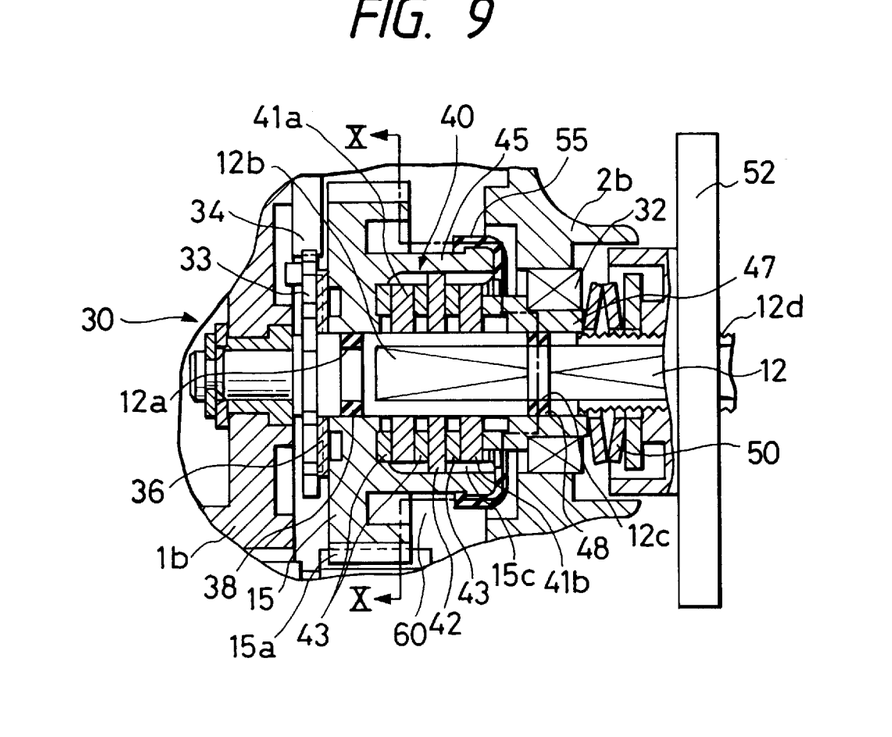
FIG. 9 is an enlarged diagram of the braking device showing the sealing arrangement of the fifth embodiment.
Figure 10:
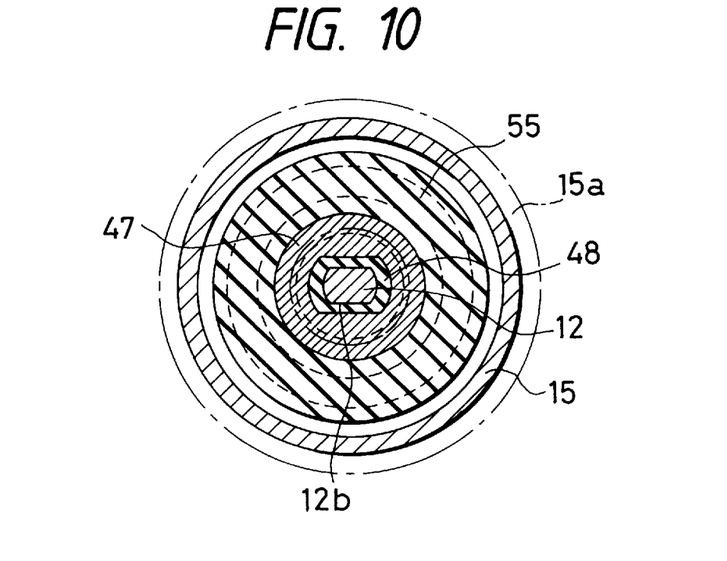
FIG. 10 is a sectional view taken along line X—X in FIG. 9.

With the above-described structures the seal members 38 and 48 are snugly fitted in the annular grooves 12a and 12b formed in the handle shaft 12. This feature prevents the increases in radial dimension of the drive gear and the pressing member, and simplifies the structure of the reel, which results in the miniaturization of the gear box. Thus, the braking device is reduced in weight. Hence, the reel body is well-balanced in weight, and accordingly improved in fishing operability. Furthermore, since the drive gear 15 is directly rotatably mounted on the handle shaft 12, its engagement with the pinion is improved in accuracy.

As was described above, the inside of the cylindrical portion of the drive gear is closed with the seal members 38, 48, and 55. Hence, even if, instead of a dry type lining material such as asbestos and "Teflon" which is usually employed, an oil-impregnated lining material is used, the leakage of oil will never occur. That is, since an oil-impregnated line material can be used, the resultant braking device is smooth in braking operation, and suppresses the generation of heat. Example of the oil-impregnated material are felt, leather, cork, and carbon woven-cloth.

Another example of the above-described braking device, which constitutes a sixth embodiment of the invention will be described. The sixth embodiment is fundamentally equal to the above-described embodiments, and therefore only parts of the sixth embodiment which are different from those of the other embodiments will be described.

Figure 11:
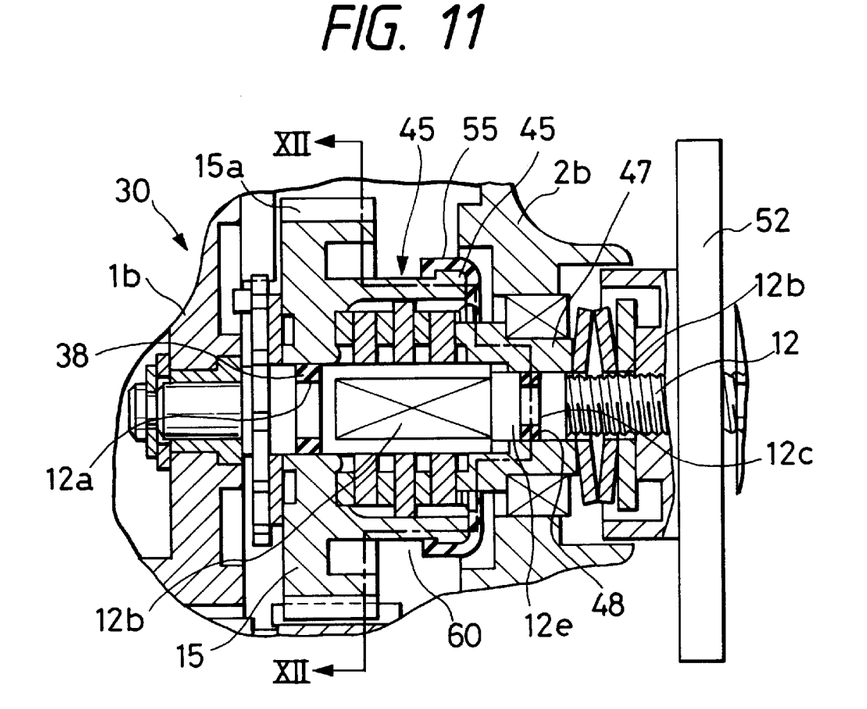
FIG. 11 is an enlarged diagram showing a sixth embodiment of the invention.
Figure 12:
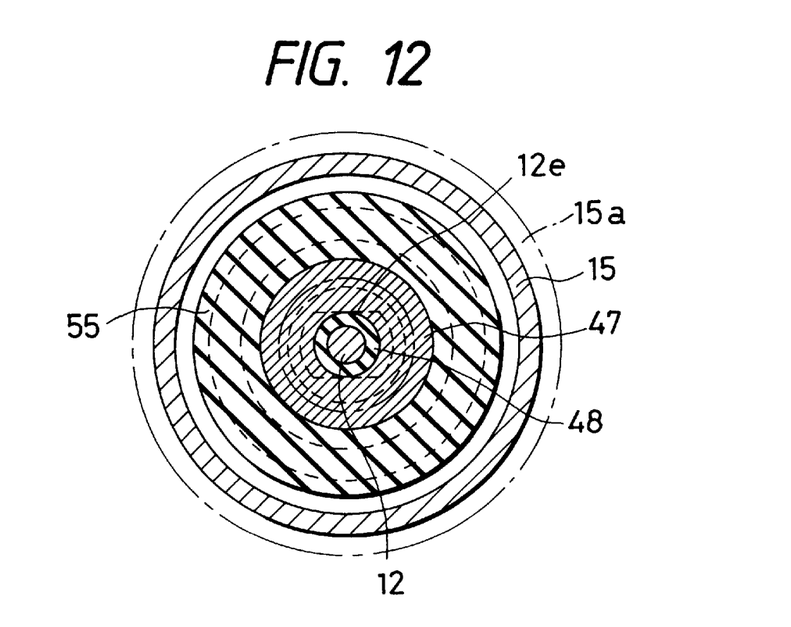
FIG. 12 is a sectional view taken along line XII—XII in FIG. 11.

FIGS. 11 and 12 shows the sixth embodiment of the invention. More specifically, FIG. 11 is an enlarged diagram showing parts of the braking device, and FIG. 12 is a sectional view taken along line XII—XII in FIG. 11. In the sixth embodiment, the part of the handle shaft 12 where the seal member 48 is positioned and the pressing member 47 is set, may be circular as indicated at 12e.

Figure 13:
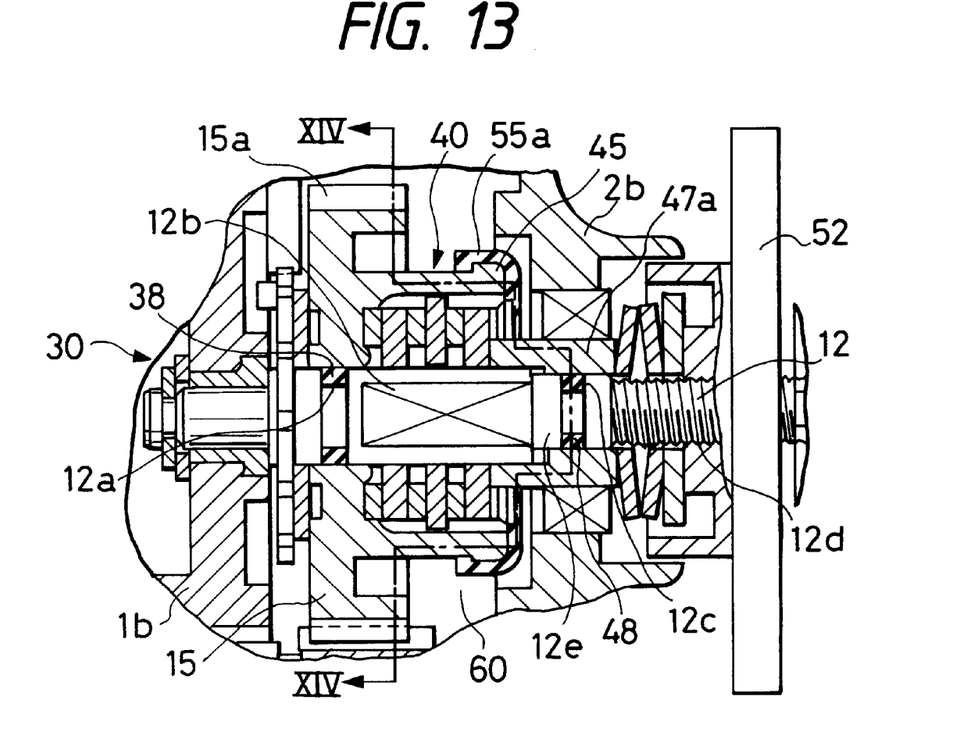
FIG. 13 is an enlarged diagram showing a seventh embodiment of the invention.
Figure 14:
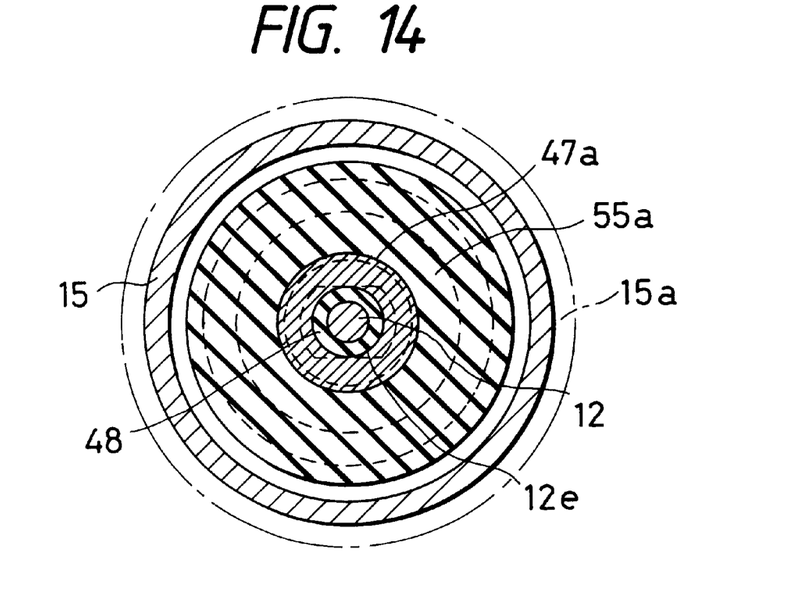
FIG. 14 is a sectional view taken along line XIV—XIV in FIG. 13.

FIGS. 13 and 14 show another example of the braking device, which constitutes a seventh embodiment of the invention. More specifically, FIG. 13 is an enlarged diagram showing parts of the braking device, and FIG. 14 is a sectional view taken along line XIV—XIV in FIG. 13. The pressing member adapted to press the braking member 40 may be variously changed in configuration. That is, in the seventh embodiment, the pressing member 47a is not stepped in the direction of axis, and instead it is in the form of a cylinder. In this case, a seal member 55a adapted to seal the accommodating cylinder 45 and the pressing member 47a is larger in width than the seal member shown in FIG. 10.

Figure 15:
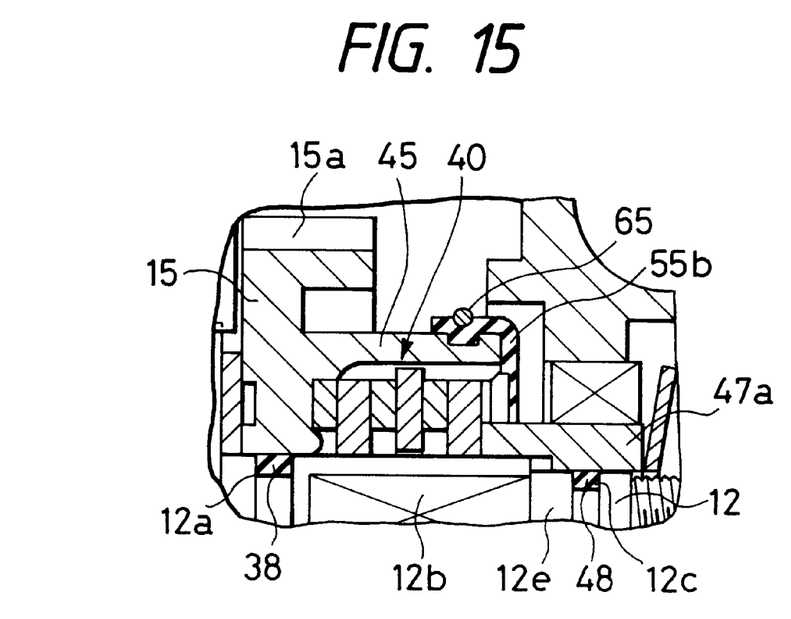
FIG. 15 is an enlarged diagram showing a eighth embodiment of the invention
Figure 16:
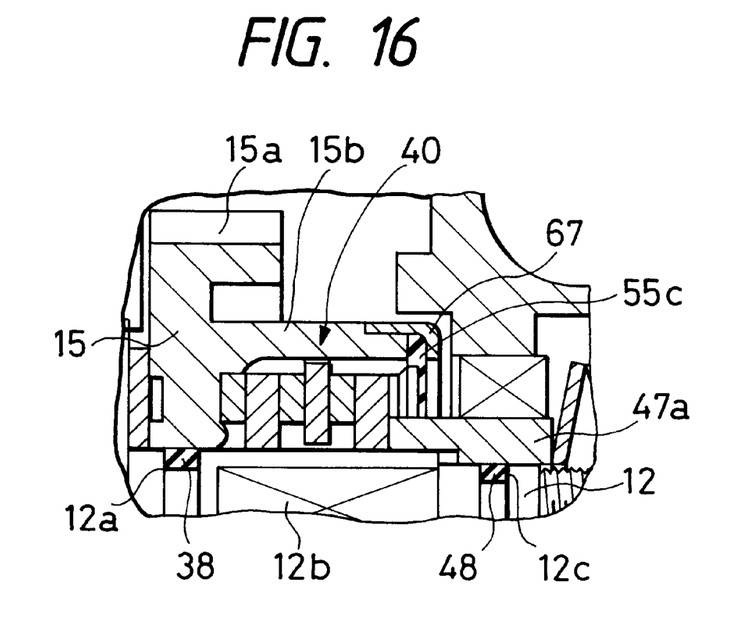
FIG. 16 is also an enlarge diagram showing a ninth embodiment of the invention.

FIG. 15 shows another example of the braking device, which constitutes a eighth embodiment of the invention. The eighth embodiment is different from the above-described ones in a method of mounting of the seal member which is arranged between the end of the accommodating cylinder 45 of the drive gear 15 and the pressing member 47a. That is, in the first, sixth and seventh embodiments shown in FIGS. 2, 11 and 13, the seal member 55 is merely fitted on the end of the cylindrical portion of the drive gear 15; while in the eighth embodiment, after the seal member 55b is fitted on the end of the cylindrical portion, it is locked with a C-shaped elastic ring 69. Alternatively, as shown in FIG. 16, first a disk-shaped seal member 55c is set on the end of the accommodating cylinder 45, and then a retaining member 67 is threadably engaged with the end of the accommodating cylinder 45 so as to seal the gap between the accommodating cylinder 45 and the pressing member 47a.

The seal members 38 and 48 fitted on the handle shaft 12, and the seal member 55 interposed between the pressing member 47 and the accommodating cylinder 45 positively prevent water or sea water from flowing along the handle shaft 12 and the pressing member 47 to the braking member 40. That is, with those seal member 38, 48 and 55, the braking member 40 in the accommodating cylinder 45 of the drive gear is completely sealed. In this case, the seal members 38 and 48 are fitted in the annular grooves 12a and 12c formed in the handle shaft 12, which minimizes the radial increase of the drive shaft and the pressing member; that is, the gear box can be miniaturized as much, and accordingly the braking device is reduced in weight. In addition, the reel body 1 is well-balanced in weight, and improved in fishing operability.

The inside of the accommodating cylinder 45 of the drive gear is sealingly closed with the seal members 38, 48, and 55. Hence, even if, instead of a dry type lining material such as asbestos and "Teflon" which is usually employed, an oil-impregnated lining material is used, the leakage of oil will never occur. That is, since an oil-impregnated lining material can be used, the resultant braking device is smooth in braking operation, and suppresses the generation of heat. Example of the oil-impregnated material are felt, leather, cork, and carbon woven-cloth.

While the invention has been described with reference to the double-bearing type fishing reel, the technical concept of the invention may be applied to the braking device of a spinning reel.

In the fishing reel braking device of the invention, the limited space in the gear box is effectively utilized. This feature prevents the whole fishing reel from increasing both in size and in weight. In addition, in the braking device, the braking member is positively prevented from the entrance of water. Furthermore, the fishing reel is well-balanced in weight, which contributes to an improvement in fishing operability.

While the foregoing invention has been shown and described with references to preferred embodiments, it will be understood by those of skill in the art that various changes in form and detail may be made therein without departing from the spirit and scope of the present invention.

What is claimed is:

1. A fishing reel braking device for use in a fishing reel in which a spool rotatably supported on a reel body is driven by a handle shaft to take up a fishing line, said braking device comprising:
   a drive gear rotatably mounted on said handle shaft;
   a braking member interposed between said drive gear and said handle shaft to generate a braking force therebetween;
   an adjusting member movable relative to said handle shaft, said adjusting member acting on said braking member through a pressing member to adjust the braking force;
   accommodating cylinder which houses said braking member in an annular recess formed in said accommodating cylinders wherein said braking member is sealingly housed in said accommodating cylinder by a first seal member disposed directly between said handle shaft and said pressing member and a second seal member mounted directly on said accommodating cylinder and said pressing member; and
   wherein a base end portion of said accommodating cylinder is non-rotatably fixed to said drive gear.

2. A fishing reel braking device as claimed in claim 1, wherein said accommodating cylinder is detachably fixed to said drive gear.

3. A fishing reel braking device as claimed in claim 1, wherein said base end portion of said accommodating cylinder is fixed to a side of said drive gear.

4. A fishing reel braking device as claimed in claim 1, wherein an annular recess is formed in a side of said drive gear, and said base end portion of said accommodating cylinder is fixedly fitted in said annular recess.

5. A fishing reel braking device as claimed in claim 4, wherein a radially extending surface of said accommodating cylinder is flush with a corresponding surface of said drive gear adjacent said annular recess.

6. A fishing reel braking device as claimed in claim 4, wherein said annular recess defines a central boss on said drive gear, said central boss having a non-circular portion parallel to a tangent of said handle shaft.

7. A fishing reel braking device as claimed in claim 6, wherein said base end portion of said accommodating cylinder has a corresponding non-circular surface engaging said non-circular portion of said central boss to thereby prevent relative rotation between said accommodating cylinder and said drive gear.

8. A fishing reel braking device for use in a fishing reel in which a spool rotatable supported on a reel body is driven by a handle shaft to take up a fishing line, said braking device comprising:

a drive gear rotatable mounted on said handle shaft;

a braking member interposed between said drive gear and said handle shaft to generate a braking force therebetween;

an adjusting member movable relative to said handle shaft, said adjusting member acting on said braking member through a pressing member to adjust the braking force;

an accommodating cylinder which houses said braking member in an annular recess formed in said accommodating cylinder;

wherein a base end portion of said accommodating cylinder is non-rotatably fixed to said drive gear, and wherein an annular recess is formed in a side of said drive gear, and said base end portion of said accommodating cylinder is fixedly fitted in said annular recess, a radially extending surface of said accommodating cylinder is flush with a corresponding surface of said drive gear adjacent said annular recess, and an elastic member is interposed between an outer cylindrical surface of said base end portion and said annular recess to prevent play therebetween.

9. A fishing reel braking device as claimed in claim 1, wherein a portion of said handle shaft circumscribed by said braking device is hollow to compensate for a weight of said braking device.

10. A fishing reel braking device as claimed in claim 4, further comprising locking holes disposed in said annular recess, said locking holes receiving locking protrusions formed on said base end portion.

11. A fishing reel braking device as claimed in claim 10, wherein said locking holes pass through said drive gear, said locking protrusions being caulked to fix said accommodating cylinder to said drive gear.

12. A fishing reel braking device as claimed in claim 4, further comprising locking holes disposed in said annular recess, said locking holes receiving a fastening member passing through said base end portion.

13. A fishing reel braking device as claimed in claim 1, wherein said accommodating cylinder circumscribes said braking member.

14. A fishing reel braking device as claimed in claim 1, wherein said braking member comprises at least one braking board non-rotatably fitted on said handle shaft, and at least one corresponding braking plate non-rotatably fitted within said accommodating cylinder, said braking board frictionally engaging said braking plate to thereby generate said braking force.

15. A fishing reel braking device as claimed in claim 1, wherein said adjusting member is threadingly engaged with said handle shaft.

16. A fishing reel braking device as claimed in claim 1, further comprising a first seal member mounted on a first part of said handle shaft on which said drive gear is mounted.

17. A fishing reel braking device as claimed in claim 16, further comprising a second seal member mounted on a second part of said handle shaft on which said pressing member is mounted.

18. A fishing reel braking device as claimed in claim 17, further comprising a seal member is provided between said accommodating cylinder and said pressing member in such a manner that said accommodating cylinder and said pressing member are rotatable with respect to each other, so that said braking member is sealingly accommodated in said accommodating cylinder.

19. A fishing reel braking device for use in a fishing reel in which a spool rotatably supported on a reel body is driven by a handle shaft to take up a fishing line, said braking device comprising:

a drive gear rotatably mounted on said handle shaft;

a braking member interposed between said drive gear and said handle shaft to generate a braking force therebetween, said braking member being formed of at least one braking board mounted directly to the handle shaft to rotate with said handle shaft, and at least one braking plate mounted to rotate relative to said at least one braking board;

an adjusting member movable relative to said handle shaft, said adjusting member acting on at least one braking board and said at least one braking plate of said braking member through a pressing member to adjust the braking force; and an accommodating cylinder which houses said braking member, said at least one braking plate being mounted to rotate with said accommodating cylinder;

wherein said braking member is sealingly housed in said accommodating cylinder by a first seal member disposed between said handle shaft and said pressing member and a second seal member mounted between said accommodating cylinder and said pressing member.

20. A fishing reel braking device as claimed in claim 19, wherein a third seal member is mounted on a first part of said handle shaft on which said drive gear is mounted.

21. A fishing reel braking device as claimed in claim 19, wherein a second seal member is mounted on a second part of said handle shaft on which said pressing member is mounted.

22. A fishing reel braking device as claimed in claim 19, wherein said accommodating cylinder and said pressing member are rotatable with respect to each other.

23. A fishing reel braking device as claimed in claim 20 wherein said third seal member is disposed in an annular groove formed in said handle shaft.

24. A fishing reel braking device as claimed in claim 21, wherein said seal member is disposed in an annular groove formed in said handle shaft.

25. A fishing reel braking device as claimed in claim 24, wherein said annular groove is circular in cross section.

26. A fishing reel braking device as claimed in claim 19, wherein an oil-impregnated material is disposed within said braking member to provide a smooth braking operation and to suppress heat generation.

27. A fishing reel braking device as claimed in claim 26, wherein the oil-impregnated material is selected from the group consisting of felt, leather, cork and carbon woven cloth.

28. A fishing reel braking device as claimed in claim 22, wherein said second seal member is fitted on an annular end of said accommodating cylinder.

29. A fishing reel braking device as claimed in claim 28, wherein said second seal member is retained on said accommodating cylinder by a ring member, said second seal member being disposed between said accommodating cylinder and said ring member.

30. A fishing reel braking device as claimed in claim 28, wherein said second seal member is retained on said accommodating cylinder by a cap member threadingly engaged with said annular end of said accommodating cylinder.

31. A fishing reel braking device for use in a fishing reel in which a spool rotatably supported on a reel body is driven by a handle shaft to take up a fishing line, said braking device comprising:

a drive gear rotatably mounted on said handle shaft; a braking member interposed between said drive gear and said handle shaft to generate a braking force therebetween; an adjusting member movable relative to said handle shaft, said adjusting member acting on said braking member through a pressing member to adjust the braking force; and an accommodating cylinder which houses said braking member, said braking member being received in a cup-shaped recess formed in said accommodating cylinder, said annular recess defining a leading edge at its open end;

wherein said braking member is sealingly housed in said accommodating cylinder by a cap member fitted on said leading edge of said annular recess to thereby close said open end.

32. A fishing reel braking device as claimed in claim 31, wherein said cap member is retained on said accommodating cylinder by a ring member, said cap member being disposed between said accommodating cylinder and said ring member.

33. A fishing reel braking device as claimed in claim 31, wherein said cap member is retained on said accommodating cylinder by a retaining member threadingly engaged with said annular end of said accommodating cylinder.

* * * * *